US010460360B2

(12) United States Patent
Wayne et al.

(10) Patent No.: US 10,460,360 B2
(45) Date of Patent: Oct. 29, 2019

(54) TECHNIQUE FOR PRICING A SOLAR POWER SYSTEM

(71) Applicant: SUNRUN, INC., Fremont, CA (US)

(72) Inventors: Gary Wayne, Berkeley, CA (US); Billy Hinners, San Rafael, CA (US); John Hovell, San Francisco, CA (US); Charles Buhler, San Francisco, CA (US); Jake Wachman, San Francisco, CA (US)

(73) Assignee: Sunrun, Inc., San Francisco, CA (US)

( * ) Notice: Subject to any disclaimer, the term of this patent is extended or adjusted under 35 U.S.C. 154(b) by 1386 days.

(21) Appl. No.: 14/299,925

(22) Filed: Jun. 9, 2014

(65) Prior Publication Data

US 2014/0289168 A1 Sep. 25, 2014

Related U.S. Application Data

(63) Continuation-in-part of application No. 13/685,526, filed on Nov. 26, 2012, now Pat. No. 9,201,987.

(51) Int. Cl.
*G06F 17/50* (2006.01)
*G06Q 30/06* (2012.01)
(Continued)

(52) U.S. Cl.
CPC ...... *G06Q 30/0283* (2013.01); *F24S 2201/00* (2018.05); *G06F 17/5009* (2013.01);
(Continued)

(58) Field of Classification Search
CPC ............. F24J 2200/04; G06Q 30/0283; G06Q 30/0206; G06Q 50/06; G06F 17/5004; G06F 17/50; G06F 2217/06
(Continued)

(56) References Cited

U.S. PATENT DOCUMENTS 4,700,317 A * 10/1987 Watanabe ............. G06F 17/509
703/1
8,417,061 B2 * 4/2013 Kennedy .............. G06K 9/0063
382/282

(Continued)

OTHER PUBLICATIONS

"A computational tool for evaluating the economics of solar and wind microgeneration of electricity" by J. Kelleher et al (Science Direct Energy 43 (2009) 401-409).*

(Continued)

*Primary Examiner* — Thai Q Phan
(74) *Attorney, Agent, or Firm* — Kramer Levin Naftalis & Frankel LLP

(57) ABSTRACT

A configuration engine traverses sequential levels of a decision tree in order to iteratively refine a configuration for a solar power system. At each level of the decision tree, the configuration engine determines the outcome of a design decision based on computing the result of a value function. The configuration engine explores configurations that optimize the value function result compared to other configurations, and may also discard less optimal configurations. When a current configuration is considered less optimal than a previous configuration generated at a previous level, the configuration engine discards the current configuration and re-traverses the decision tree starting with the previous configuration.

21 Claims, 11 Drawing Sheets

(51) Int. Cl.
*G06F 9/445* (2018.01)
*G06Q 30/02* (2012.01)

(52) U.S. Cl.
CPC ..... *G06F 2217/78* (2013.01); *G06Q 30/0621* (2013.01); *Y04S 50/14* (2013.01)

(58) Field of Classification Search
USPC ............................................ 703/1, 5, 19, 22
See application file for complete search history.

(56) References Cited

U.S. PATENT DOCUMENTS

| | | | | |
|---|---|---|---|---|
| 8,504,471 | B2* | 8/2013 | Mobley | G06Q 20/102 705/35 |
| 9,053,275 | B2* | 6/2015 | Brier | G06F 17/5063 |
| 9,087,338 | B2* | 7/2015 | Levine | G06Q 30/02 |
| 2006/0265287 | A1* | 11/2006 | Kubo | G06Q 10/06 705/26.1 |
| 2007/0150198 | A1* | 6/2007 | MacDonald | G01J 1/4228 702/2 |
| 2007/0150366 | A1* | 6/2007 | Yahiro | G06Q 10/10 705/14.34 |
| 2008/0091626 | A1* | 4/2008 | Kremen | G06Q 40/00 705/412 |
| 2009/0132360 | A1* | 5/2009 | Arfin | G06Q 30/02 705/14.14 |
| 2009/0234692 | A1* | 9/2009 | Powell | G06F 17/30241 705/26.4 |
| 2009/0304227 | A1* | 12/2009 | Kennedy | G06K 9/0063 382/100 |
| 2010/0138061 | A1 | 6/2010 | Walling et al. | |
| 2010/0146087 | A1* | 6/2010 | Kumar | G06F 9/4443 709/221 |
| 2010/0217565 | A1* | 8/2010 | Wayne | G06F 17/5004 703/1 |
| 2010/0217566 | A1* | 8/2010 | Wayne | G06F 17/50 703/1 |
| 2010/0217639 | A1* | 8/2010 | Wayne | G06Q 10/103 705/7.23 |
| 2010/0217724 | A1* | 8/2010 | Wayne | G06Q 10/067 705/348 |
| 2011/0174294 | A1 | 7/2011 | Adel et al. | |
| 2011/0202446 | A1* | 8/2011 | Kremen | G01D 4/004 705/37 |
| 2011/0301790 | A1* | 12/2011 | Atluri | B60K 16/00 701/22 |
| 2012/0084172 | A1* | 4/2012 | Lee | G06Q 30/0601 705/26.3 |
| 2012/0091800 | A1 | 4/2012 | Shenoy et al. | |
| 2012/0152877 | A1 | 6/2012 | Tadayon | |
| 2012/0325290 | A1 | 12/2012 | Gizara | |
| 2012/0330759 | A1* | 12/2012 | Aggarwal | G06Q 30/0282 705/14.73 |
| 2013/0026842 | A1 | 1/2013 | Arditi et al. | |
| 2013/0061189 | A1 | 3/2013 | Brier et al. | |
| 2013/0158954 | A1* | 6/2013 | Wayne | G06F 17/50 703/1 |
| 2013/0246010 | A1* | 9/2013 | Dershowitz | H01L 31/042 703/1 |
| 2013/0269181 | A1* | 10/2013 | McBride | H02S 40/00 29/825 |
| 2014/0001864 | A1 | 1/2014 | Nirantare et al. | |
| 2014/0062206 | A1 | 3/2014 | Bryson | |
| 2014/0130840 | A1* | 5/2014 | Hinners | H01L 31/042 136/244 |
| 2014/0149081 | A1* | 5/2014 | Hinners | G06F 17/50 703/1 |
| 2014/0289168 | A1* | 9/2014 | Wayne | G06Q 30/0283 705/400 |
| 2015/0088682 | A1* | 3/2015 | Wayne | G06F 17/50 705/26.5 |
| 2015/0331972 | A1* | 11/2015 | McClure | H02S 10/00 703/2 |
| 2015/0339762 | A1* | 11/2015 | Deal | G06Q 30/0641 705/27.1 |
| 2016/0140283 | A1* | 5/2016 | Morse | G06F 17/5004 716/135 |
| 2017/0091578 | A1* | 3/2017 | Ananthakrishnan | G06K 9/4661 |

OTHER PUBLICATIONS

International Search Report, dated Feb. 10, 2014, issued in corresponding International Application No. PCT/US2013/059213.

* cited by examiner

TECHNIQUE FOR PRICING A SOLAR POWER SYSTEM

CROSS-REFERENCE TO RELATED APPLICATIONS

This application is a continuation-in-part (CIP) of U.S. patent application titled "Method and System for Generating Multiple Configuration for a Solar Power System" filed on Nov. 26, 2012 and having Ser. No. 13/685,526. The subject matter of this related application is hereby incorporated herein by reference.

BACKGROUND OF THE INVENTION

Field of the Invention

The present invention generally relates to solar power systems, and, more specifically, to a technique for pricing a solar power system.

Description of the Related Art

Solar power systems have provided a source of renewable energy for decades. These systems are configured by either manually or automatically selecting from a range of design options including, for example, solar panel type and placement. In recent years, the majority of these systems have been provided to customers as equipment leases or Power Purchase Agreements ("PPA") requiring the collaboration of multiple parties including the financier, property owner, builder and seller. Pricing solutions for these financed solar power systems are determined by a sales expert who explores values for various pricing parameters such as the down payment, the lease term or the annual rate adjustment. The sales expert then selects configurations and pricing solutions to present to the customer.

One problem with conventional pricing methodologies is that the sales person has limited ability to explore the potentially millions of pricing solutions created by the combinations of pricing parameters. This problem is compounded by the fact that not all pricing solutions are viable for all of the parties involved.

Accordingly, what is needed in the art is an improved technique for pricing solar power systems.

SUMMARY OF THE INVENTION

Embodiments of the invention include a computer-implemented method for generating pricing solutions for a solar power system configuration, each pricing solution reflecting one or more pricing parameters, including receiving a solar power system configuration generated by traversing a decision tree that includes a sequence of levels, each level in the sequence of levels corresponding to a different design decision associated with the solar power system, receiving, via a graphical user interface (GUI) displayed by a display device, a set of pricing parameters, wherein a first pricing parameter in the set of pricing parameters reflects a first attribute of the solar power system configuration and a corresponding first range of possible values for the first attribute, receiving, via the GUI, a selection of a subset of the first range of possible values associated with the first pricing parameter, generating, by a processing unit coupled to the display device, at least one pricing solution based on the selection of the subset of the first range of possible values, wherein the at least one pricing solution comprises a price for the solar power system configuration that is constrained by the subset of the first range of possible values, and displaying, on the display device, the at least one pricing solution.

One advantage of the disclosed techniques is that the number of solar power configurations and pricing solutions that can be explored is greatly expanded resulting in more available options and lower cost for the buyer.

BRIEF DESCRIPTION OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the invention subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

System Overview

Figure 1:
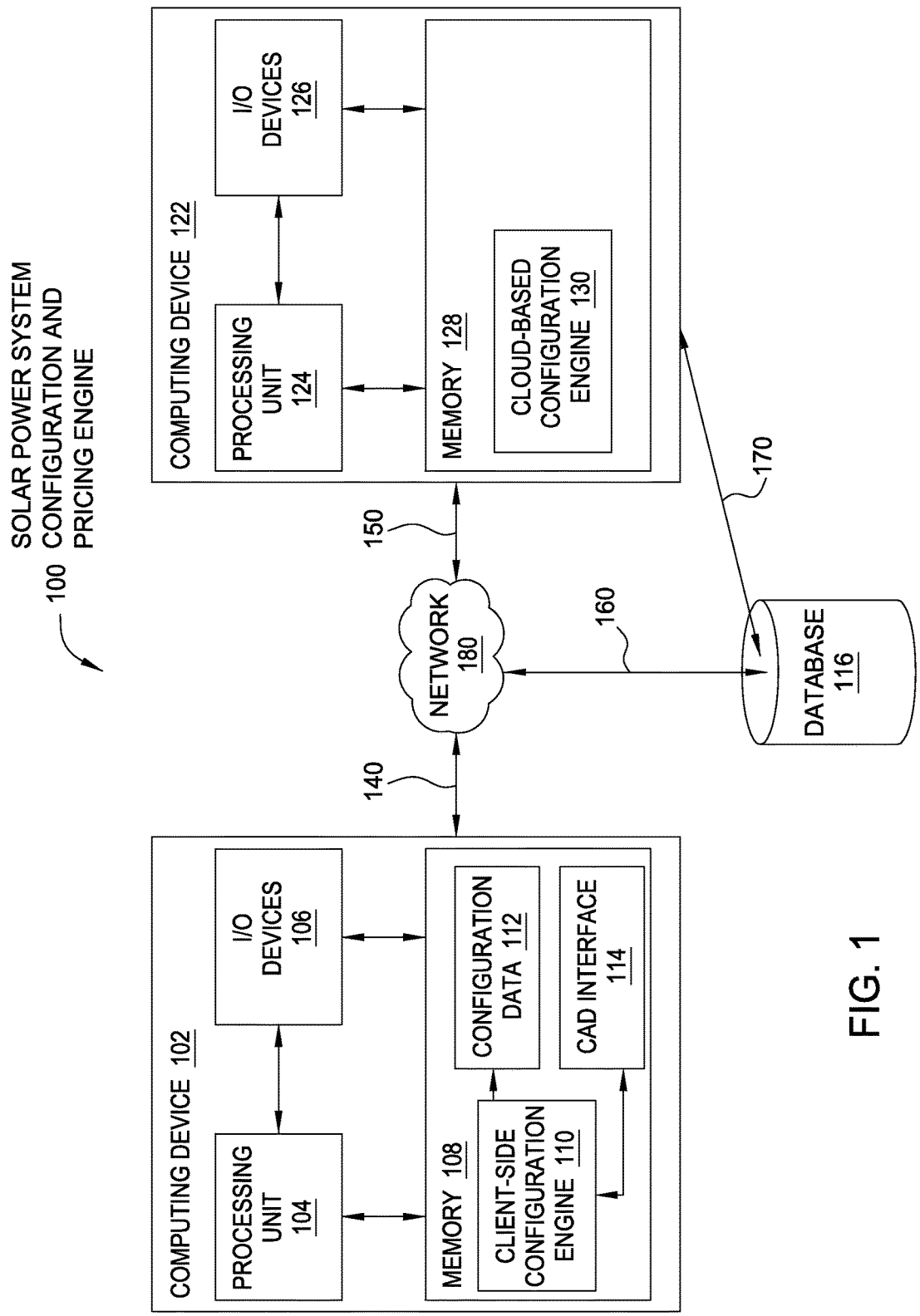
FIG. 1 is a block diagram illustrating one embodiment of a solar power system configuration and pricing engine 100 configured to implement one or more aspects of the present invention.

FIG. 1 is a block diagram illustrating a solar power system configuration and pricing engine 100 configured to implement one or more aspects of the present invention. Solar power system configuration and pricing engine 100 generates solar power system layouts, and, additionally, generates pricing solutions for financing those layouts. FIGS. 1-7 describe the functionality of solar power system configuration and pricing engine 100 related primarily to configuring solar power system layouts. As such, in those figures, solar power system configuration and pricing engine 100 may simply be referred to as "configuration engine 100." Similarly, FIGS. 8-11 describe functionality of solar power system configuration and pricing engine 100 related primarily to generating pricing solutions for financing solar power systems. Thus, in FIGS. 8-11, solar power system configuration and pricing engine 100 may simply be referred to as "pricing engine 100."

As shown in FIG. 1, solar power system configuration and pricing engine 100, also referred to as configuration engine 100, includes a computing device 102, a computing device 122, and a database 116 coupled together by a network 180. Network 180 could be any type of network, such as, e.g., the Internet or the World Wide Web.

Computing device 102 and computing device 122 are configured to exchange data across network 180 via communication paths 140 and 150. Computing device 102 may also read data from or write data to database 116 across network 180 via communication paths 140 and 160. Likewise, computing device 122 may read data from or write data to database 116 across network 180 via communication paths 150 and 160 or, alternatively, directly via communication path 170. Communication paths 140, 150, 160 and 170 may each be implemented as a wireless communication path, a wired communication path, or any other technically feasible type of communication path capable of transporting data.

As further described below in conjunction with FIGS. 2-6, computing device 102 and computing device 122 are configured to cooperate in order to generate multiple possible configurations for a solar power system. In doing so, computing devices 102 and 122 traverse a "decision tree" that specifies a sequence of different design decisions associated with the design of a solar power system. For a given design decision, computing devices 102 and 122 select from various possible outcomes to that decision. The outcome of a design decision could be, for example, the determination of a portion of a target surface on which to mount solar modules (e.g., photovoltaic solar panels) or the selection of a particular type of solar module, among other possible outcomes. By determining each outcome, computing devices 102 and 122 generate one or more solar power system configurations. Computing devices 102 and 122 are also configured to explore different "branches" of the decision tree in order to identify multiple solar power system configurations, where each branch represents a different set of outcomes for the various design decisions in the decision tree.

When generating solar power system configurations, computing devices 102 and/or 122 access database 116 in order to extract data that describes a target installation location for the solar power system. The extracted data may represent a set of constraints associated with a given target installation location and may also include data representing physical components and/or materials that may be used to build the solar power system, local electricity rates, and so forth. Computing devices 102 and/or 122 are configured to analyze the extracted data and, based on that data, traverse the decision tree mentioned above in order to generate one or more solar power system configurations.

In one embodiment, computing device 102 operates as a client device and computing device 122 operates as a cloud-based device. In this embodiment, computing device 102 causes computing device 122 to perform the majority of the processing operations involved with generating solar power system configurations. Persons skilled in the art will recognize that computing device 102 and computing device 122 may distribute the processing tasks involved with determining solar power system configurations based on any technically feasible load-balancing algorithm. Those skilled in the art will also understand that either of computing devices 102 or 122 may perform all of the disclosed functionality of the present invention independently, i.e. without being coupled to another computing device, in a non-distributed manner. In such situations, the computing device performing the disclosed functionality may be a desktop computing device, laptop computing device, handheld computing device, and so forth.

Computing device 102 includes a processing unit 104 that is configured to perform various processing tasks and is coupled to input/output (I/O) devices 106 and to a memory 108. As shown, I/O devices 106 are also coupled to memory 108. Processing unit 104 may include one or more central processing unit (CPUs), parallel processing unit (PPUs), graphics processing unit (GPUs), application-specific integrated circuit (ASICs), field-programmable gate arrays (FPGAs), or any other type of processing unit capable of processing data. In addition, processing unit 104 may include various combinations of processing units, such as, e.g., a CPU coupled to a GPU. In on embodiment, computing device 102 is a mobile computing device, such as, e.g., a cell phone or tablet computing device.

I/O devices 106 may include input devices, such as a keyboard, a mouse, a touchpad, a microphone, a video camera, and so forth. I/O devices 106 may also include output devices, such as a screen, a speaker, a printer, and so forth. In addition, I/O devices 106 may include devices capable of performing both input and output operations, such as a touch screen, an Ethernet port, a universal serial bus (USB) port, a serial port, etc. I/O devices 106, as well as processing unit 104 described above, are both configured to read data from and write data to memory 108.

Memory 108 may include a hard disk, one or more random access memory (RAM) modules, a compact disc (CD) residing within a CD drive, a zip disk, and so forth. Persons skilled in the art will understand that memory 108 could be implemented as any technically feasible unit capable of storing data. Memory 108 includes a client-side configuration engine 110, configuration data 112, and a client-side computer-aided design (CAD) interface 114.

Client side configuration engine 110 is a software program that includes a set of program instructions capable of being executed by processing unit 104. When executed by processing unit 104, client-side configuration engine 110 configures processing unit 104 to participate in generating multiple configurations for a solar power system to be installed on the target surface, as mentioned above. In doing so, client-side configuration engine 110 may cooperate with a corresponding software program within computing device 122, a cloud-based configuration engine 130, in order to determine outcomes to the various design decisions associated with the solar power system configurations. Client-side configuration engine 110 cooperates with cloud-based configuration engine 130 in order to generate configuration data 112, which reflects each outcome to the various design decisions.

Computing device 122 may be substantially similar to computing device 102 and includes a processing unit 124 that is configured to perform various processing tasks. Processing unit 124 is coupled to I/O devices 126 and to a memory 128. As shown, I/O devices 126 are also coupled to memory 128. Processing unit 124 may be substantially similar to processing unit 104 included within computing device 102, and, thus, may include one or more CPUs, PPUs, GPUs, ASICs, FPGAs, as well as various combinations of processing components, such as, e.g., a CPU coupled to a GPU.

I/O devices 126 may be substantially similar to I/O devices 106 included within computing device 102, and, thus, may include input devices, such as a keyboard, a mouse, a touchpad, a microphone, a video camera, and so forth, output devices, such as a screen, a speaker, a printer, and so forth, as well as devices capable of performing both input and output operations, such as a touch screen, an Ethernet port, a USB port, a serial port, etc. I/O devices 126, as well as processing unit 124 described above, are both configured to read data from and write data to memory 128.

Memory 128 may be substantially similar to memory 108 included within computing device 102, and, thus, may include a hard disk, one or more RAM modules, a CD residing within a CD drive, a zip disk, and so forth. Persons skilled in the art will understand that memory 128 could be implemented by any technically feasible unit capable of storing data. Memory 128 includes cloud-based configuration engine 130.

Cloud-based configuration engine 130 is a software program that includes a set of program instructions capable of being executed by processing unit 124. When executed by processing unit 124, cloud-based configuration engine 130 configures processing unit 124 to cooperate with client-side configuration engine 110, in generating the multiple solar power system configurations. In doing so, cloud-based configuration engine 130 and/or client-side configuration engine 110 are configured to extract data that describes the target installation location from database 116 and then process that data.

Database 116 may be a computer system executing a database program, such as, e.g. MySQL or postgreSQL, or may also be a cloud-based service configured to provide data based on requests transmitted by remote computer systems, such as, e.g. Google Earth®, Bing™ Maps, Pictometry® Online for geocoded RGB imagery, Digital Surface Models and Digital Elevation Models and Clean Power Research's powerBILL® or the Genability Tariff Cloud for utility electricity tariffs and local, state and federal incentives. In one embodiment, database 116 is included within computing device 122 or computing device 102 or, alternatively, distributed between computing devices 102 and 122.

Database 116 includes geospatial data that may describe target installation locations suitable for solar power systems to be installed. For example, database 116 could include a set of aerial or satellite photographs of three-dimensional (3D) structures, Digital Surface Models or Digital Elevation Models. Each of these could be used to identify land surfaces, structures suitable for solar power installations and to identify shading of those facilities. Database 116 may also include one or more 3D models representing 3D structures and obstructions, like trees, that might cast shadows on the solar array. In one embodiment, the 3D models are generated from a set of aerial or satellite photographs.

Client-side configuration engine 110 and cloud-based configuration engine 130 are configured to extract the geospatial data from database 116 and to analyze a portion of that data corresponding to a particular physical location. The physical location could be represented by, e.g., a street address or geospatial positioning system (GPS) coordinates, among others. In practice, client side configuration engine 110 within computing device 102 and cloud-based configuration engine 130 within computing device 122 work in conjunction with one another when generating solar power system configurations. Accordingly, for the sake of simplicity, the remainder of this description will simply describe the configuration engine 100, which includes computing devices 102 and 122, as performing the various steps involved with generating solar power system configurations, including traversing the decision tree and evaluating solar power system configurations.

Decision Tree Overview

Figure 2:
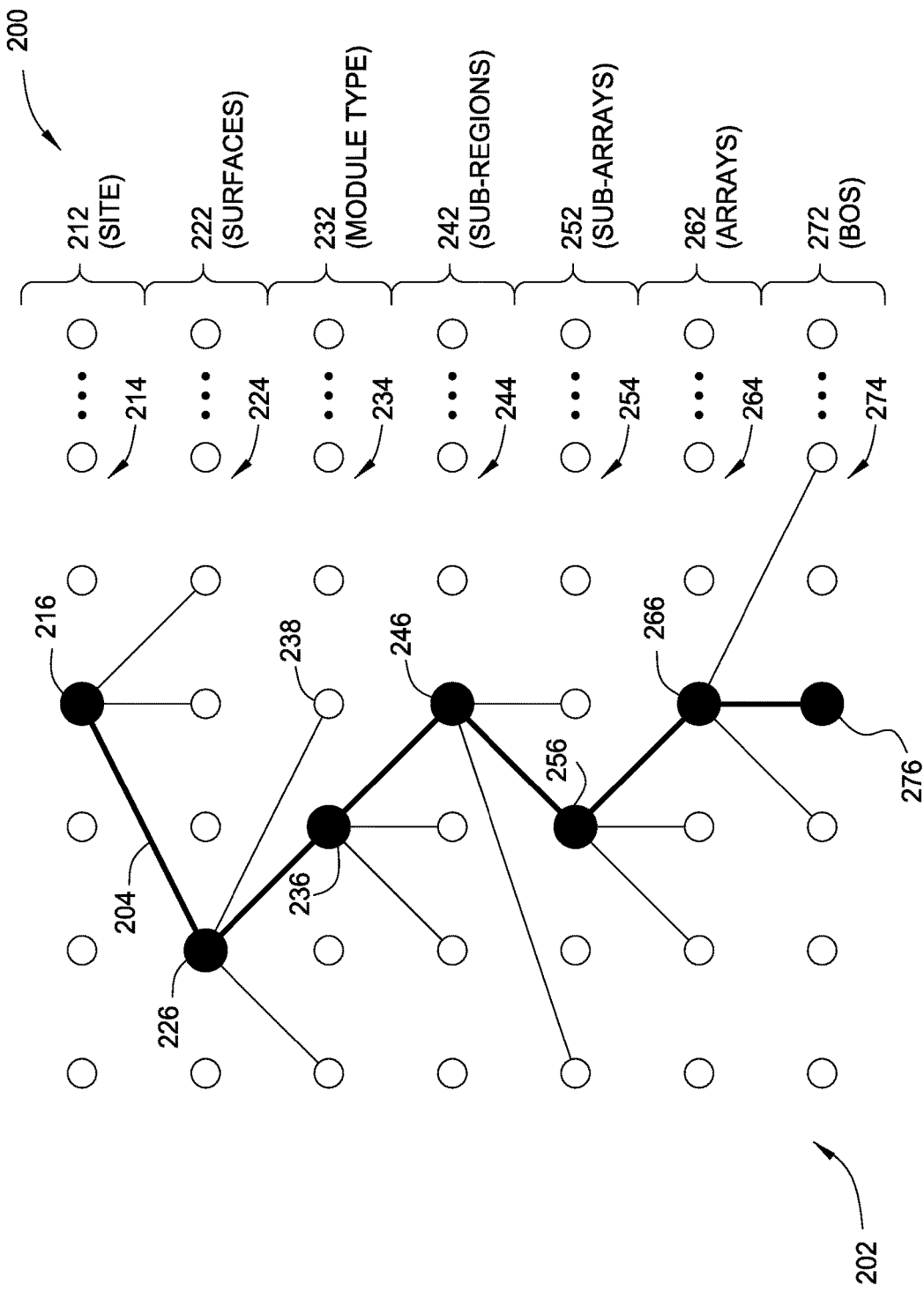
FIG. 2 is a conceptual diagram that illustrates a decision tree traversed by the computer system of FIG. 1, according to one embodiment of the present invention.

FIG. 2 is a conceptual diagram 200 that illustrates a decision tree 202 that may be traversed by configuration engine 100, according to one embodiment of the present invention. As shown, decision tree 202 includes levels 212, 222, 232, 242, 252, 262, and 272. Each of the levels included within decision tree 202 is associated with a different design decision associated with a solar power system configuration, such as, e.g. a selection of solar module type or a determination of solar module grouping. Accordingly, the outcome of each design decision constrains the solar power system configuration. Configuration engine 100 is configured to traverse decision tree 202 level by level, and, at each successive level, determine an outcome to the design decision associated with that level. In doing so, configuration engine 100 iteratively refines the solar power system configuration until the outcome for each design decision is determined.

In the exemplary embodiment discussed herein, level 212 corresponds to a "site" decision associated with the solar power system configuration and reflects a choice of the target installation location. Level 222 corresponds to a "surfaces" decision associated with the solar power system configuration and reflects a choice of surfaces onto which solar modules may be mounted. Level 232 corresponds to a "module type" decision associated with the solar power system configuration and reflects a choice of possible solar module types that may be included within the solar power system. Level 242 corresponds to a "sub-regions" decision associated with the solar power system configuration and reflects a choice of specific non-contiguous sub-regions of the surface(s) onto which solar modules may be mounted. Level 252 corresponds to a "sub-arrays" decision associated with the solar power system configuration and reflects a choice of particular sub-arrays of solar modules projected onto the different sub-regions. Level 262 corresponds to an "arrays" decision associated with the solar power system configuration and reflects a choice between different possible groupings of sub-arrays. Level 272 corresponds to a "balance of system" (BOS) decision associated with the solar power system configuration and reflects the choice of all other components needed to complete the solar power system configuration, including inverters, wiring, fuses, and so forth. Those skilled in the art will understand that the sequential order of levels shown in FIG. 2 represents just one possible ordering of levels, and that decision tree 202 could include any number of levels arranged in any order. Further, decision tree 202 could also include additional levels corresponding to other design decisions associated with the solar power system configuration.

Within a given level, configuration engine 100 may generate multiple different "candidate" configurations by implementing a heuristics engine to identify a range of technically feasible configurations. Configuration engine 100 identifies each different candidate configuration by determining a different alternative outcome to the design decision associated with that level. Configuration engine 100 is configured to then compute the result of a value function for each candidate configuration and select the candidate configuration having an optimal value function result compared to the other candidates. In this fashion, configuration engine 100 identifies candidate configurations at each level that optimize the aforementioned value function.

The value function could be, for example, levelized cost of electricity (LCOE) or net present value (NPV), among other options discussed in greater detail below. Configuration engine 100 refines the selected candidate configuration by visiting subsequent levels and successively computing a result to the value function for each level and selecting the optimal configuration. In one embodiment, configuration engine 100 selects more than one candidate configuration at each level and then refines the selected configurations separately and in parallel with one another.

As shown, level 212 includes candidate configurations 214 and a selected candidate configuration 216, level 222 includes candidate configurations 224 and a selected candidate configuration 226, level 232 includes candidate configurations 234 and a selected candidate configuration 236, level 242 includes candidate configurations 244 and a selected candidate configuration 246, level 252 includes candidate configurations 254 and a selected candidate configuration 256, level 262 includes candidate configurations 264 and a selected candidate configuration 266, and level 272 includes candidate configurations 274 and a selected candidate configuration 276. All together, the sequence of selected candidate configurations constitutes a branch 204 of decision tree 202. Those skilled in the art will recognize that each level of decision tree 202 could include any number of candidate configurations. In embodiments where configuration engine 100 selects more than one candidate configuration at each level, configuration engine 100 may explore other branches of decision tree 202 in parallel with exploring branch 204.

Traversing the Decision Tree

When traversing decision tree 202 along branch 204, configuration engine 100 begins at level 212 and selects candidate configuration 216 from within candidate configurations 214. An example of configuration engine 100 traversing level 212 is provided below in conjunction with FIG. 3. In practice, level 214 may include just one candidate configuration that corresponds to a single target installation location provided by a user, although persons skilled in the art will recognize that decision tree 202 could also be used to generate candidate configurations for different competing target installation locations. Configuration engine 100 then continues to level 222.

Configuration engine 100 generates candidate configurations 224 within level 222 by identifying different surfaces, located at the target installation location, onto which solar modules may be mounted. Configuration engine 100 selects candidate configuration 226, which includes the selection of a particular set of surfaces, based on computing a result to the value function for each of candidate configurations 224. Configuration engine 100 then continues to level 232.

Configuration engine 100 generates candidate configurations 234 within level 232 by identifying different types of solar modules that may be included within a solar power system mounted to the surfaces selected within level 222. An example of configuration engine 100 traversing levels 222 and 232 is provided below in conjunction with FIG. 4.

Configuration engine 100 selects candidate configuration 238, which includes the selection of a specific type of solar module, based on computing a result to the value function for each of candidate configurations 234. Configuration engine 100 then continues to level 242.

Configuration engine 100 generates candidate configurations 244 within level 242 by identifying different sub-regions of the surfaces selected within level 222 onto which the solar module type selected at level 232 may be mounted. An example of configuration engine 100 traversing level 242 is provided below in conjunction with FIG. 5. Configuration engine 100 selects candidate configuration 248, which includes the selection of one or more specific sub-regions of the surfaces selected at level 222, based on computing a result to the value function for each of candidate configurations 244. Configuration engine 100 then continues to level 252.

Configuration engine 100 generates candidate configurations 254 within level 252 by identifying different possible sub-arrays of solar modules projected onto the sub-regions selected within level 242. Configuration engine 100 selects candidate configuration 258, which includes the selection of one or more specific sub-arrays of solar modules, based on computing a result to the value function for each of candidate configurations 254. Configuration engine 100 then continues to level 262.

Configuration engine 100 generates candidate configurations 264 within level 262 by identifying different possible groupings of the sub-arrays selected within level 256. Configuration engine 100 selects candidate configuration 266, which includes the selection of one or more specific groupings of sub-arrays (arrays), based on computing a result to the value function for each of candidate configurations 264. Configuration engine 100 then continues to level 272.

Configuration engine 100 generates candidate configurations 274 within level 276 by identifying different possible BOS permutations. A given BOS permutation includes a specific combination of the components required by the solar power system, such as inverter types, wiring, fuses, and so forth. Configuration engine 100 selects candidate configuration 276, which includes the selection of a particular BOS permutation. An example of configuration engine 100 traversing levels 252, 262, and 272 is provided below in conjunction with FIG. 6.

By traversing decision tree 202 in the fashion described above, configuration engine 100 iteratively refines the configuration of the solar power system until arriving at level 272. Each candidate configuration 274 within level 272 represents a complete solar power system configuration. Configuration engine 100 may select candidate configuration 276 based on computing a result of the value function for each of candidate configurations 274. Alternatively, a customer may select candidate configuration 276 from among candidate configurations 274 based on, for example, aesthetics, total system size, total system cost, etc. In one embodiment, configuration engine 100 generates a graphical user interface (GUI) that includes some or all of candidate configurations 274. The GUI could, for example, allow a customer to flip through a virtual notebook that visually displays the placement of solar modules associated with different candidate configurations, allowing the customer to easily assess the aesthetic value of each configuration.

As noted above, configuration engine 100 may also explore other branches of decision tree 202 aside from branch 204 by selecting more than one candidate configuration at each level and then refining each of the selected configurations separately and in parallel with one another along different branches. Configuration engine 100 may also be configured to "prune" entire branches and the associated candidate configurations from decision tree 202 when the result of the value function for any of those configurations (i) departs significantly from a desired value function result or (ii) has a less optimal value function result compared to that associated with a previous configuration generated within a previous level. For example, configuration engine 100 could compute the result of the value function for candidate configuration 256 within level 252 and then determine that the computed value function result is less optimal than the value function result computed for candidate configuration 238 within level 232. In this situation, configuration engine 100 may discard candidate configuration 256 and return to level 232. Then, configuration engine 100 may refine candidate configuration 238 by visiting the subsequent levels starting from level 232, thereby creating a new branch within decision tree 202. Configuration engine 100 may repeat this process any number of times before arriving at level 272.

The Value Function

Configuration engine 100 is configured to select a candidate configuration within a given level based on computing the result of the value function for each candidate configuration within that level, as discussed. Since each successive level includes increasingly constrained candidate configurations, the granularity of the inputs to the value function may increase between subsequent levels depending on the degree of "completeness" associated with a given set of candidate configurations.

For example, at level 222, once configuration engine 100 has generated candidate configurations 224 corresponding to different selections of surfaces, configuration engine 100 may compute the result of the value function for a given candidate configuration based on the total area of the surfaces associated with that configuration. Then, at level 232, once configuration engine 100 has generated candidate configurations 234 corresponding to different selections of solar module type, configuration engine 100 may compute the result of the value function for a given configuration based on (i) the performance characteristics of the solar module type included within that configuration and (ii) the surfaces associated with that configuration (previously selected within level 222). Computing the value function result at level 232 based on both (i) and (ii) yields a more precise value function result than computing the value function result at level 222 based only on (ii). Hence, the value function result becomes increasingly precise as configuration engine 100 traverses decision tree 202 because each successive computation is based on increasingly granular inputs.

The value function itself could be derived from a wide variety of possible algorithms generally intended to estimate the value of a system, including algorithms that simply estimate the performance of candidate configurations as well as more complex algorithms that optimize the search process involved with traversing decision tree 202. In one embodiment, configuration engine 100 implements a cost function at each level in order to estimate the cost of the various candidate configurations associated with the different levels. Configuration engine 100 could then select candidate configurations that minimize cost. The cost function could be, for example, a best-first search, an A star (A*) search, a distance-plus-cost function, or another heuristic-based search algorithm.

When implementing the distance-plus-cost function for a given candidate configuration, configuration engine 100 implements a path-cost function based on the cost of traversing from candidate configuration 214 to one of candidate configurations 274, then computes an heuristic estimate of the distance to a complete configuration within level 272. Configuration engine 100 also implements a benefit function when estimating the performance of the candidate configurations, where the benefit function indicates the ideal performance of a given candidate configuration. Further, configuration engine 100 may extend the benefit function to account for various real-world considerations, including system life and degradation, electricity prices and price fluctuations, gross system cost, system rating, effective incentives, discount rates, and system maintenance. Configuration engine 100 may then combine the results of the cost, benefit, and value functions to produce the overall value function. Those having skill in the art will understand that various algorithms for traversing graph-like structures, such as decision tree 202, may be implemented for the value function described herein.

Generating Solar Power System Configurations

Figure 3:
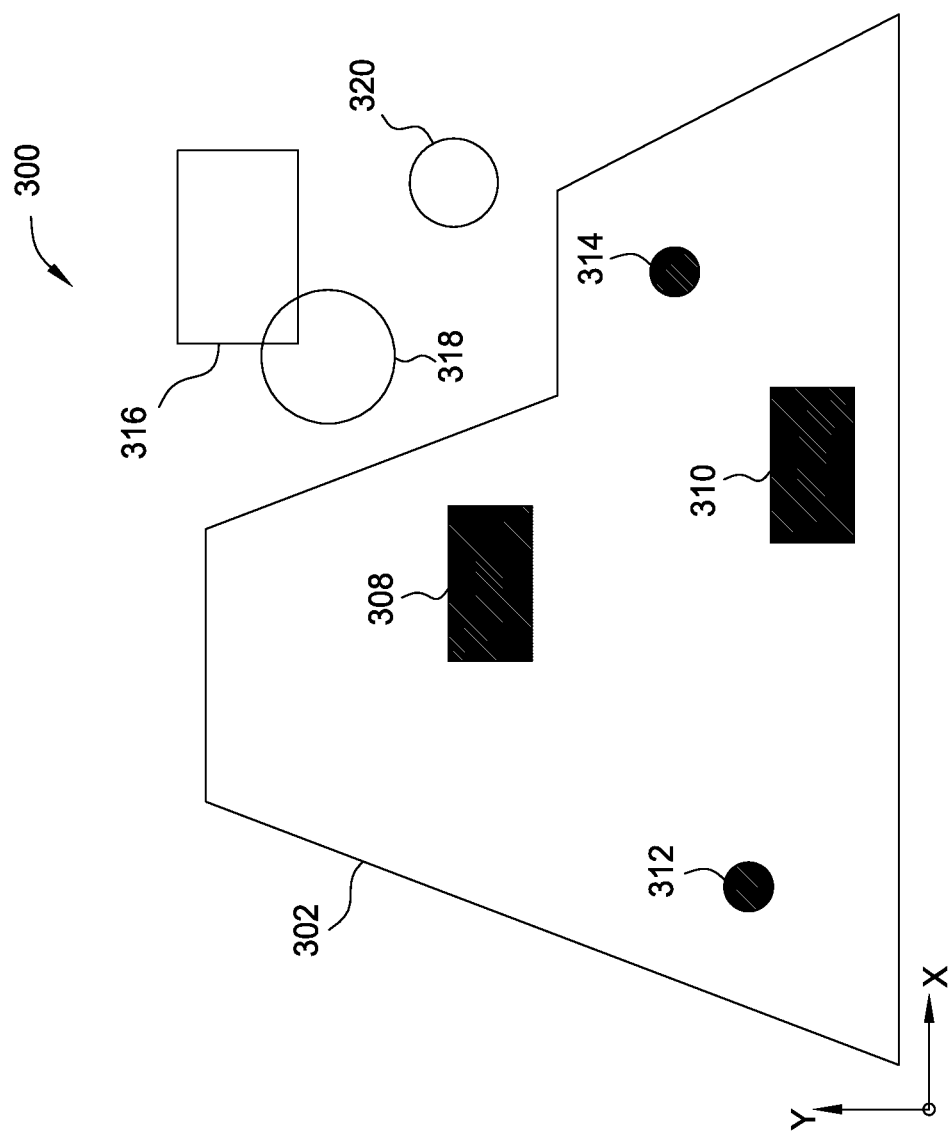
FIGS. 3-6 are conceptual diagrams illustrating different steps in a process for determining a solar power system configuration, according to one embodiment of the present invention.
Figure 4:
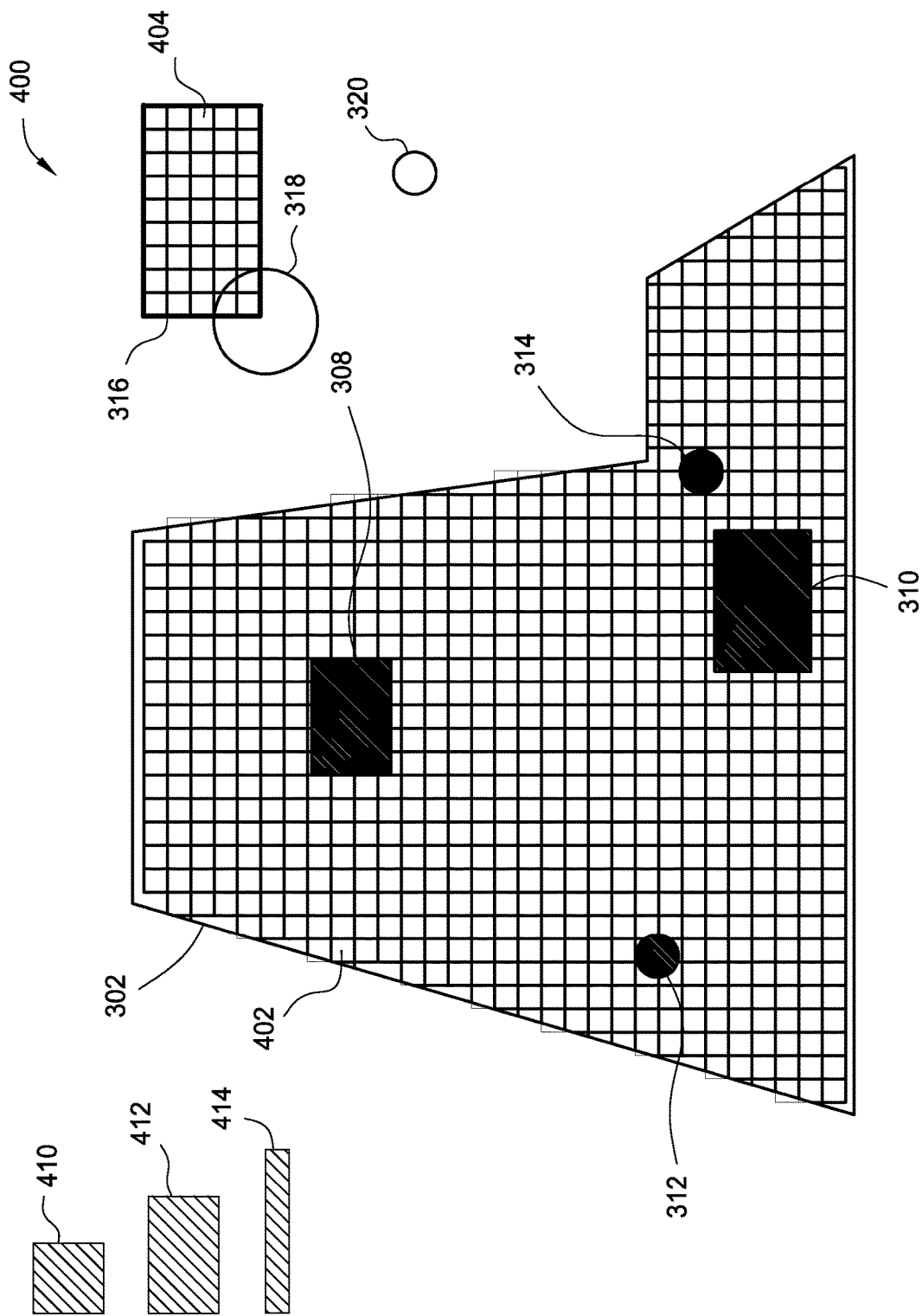
Figure 5:
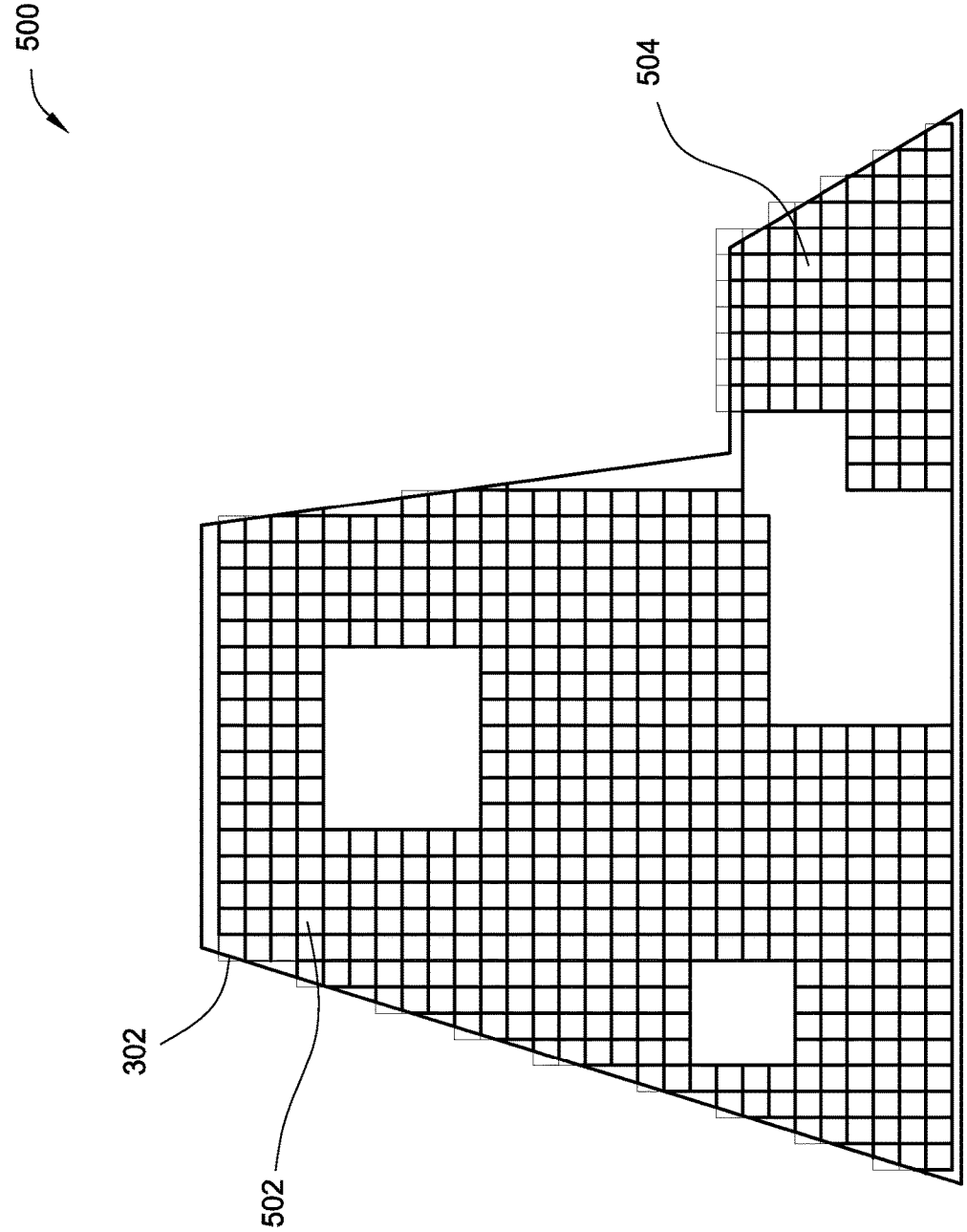

FIGS. 3-5 are conceptual diagrams each illustrating one or more different steps in the sequence of design decisions associated with generating one or more solar power system configurations, according to one embodiment of the present invention. FIGS. 3-5 relate to processing performed by configuration engine 100 when traversing decision tree 202 shown in FIG. 2.

Figure 6:
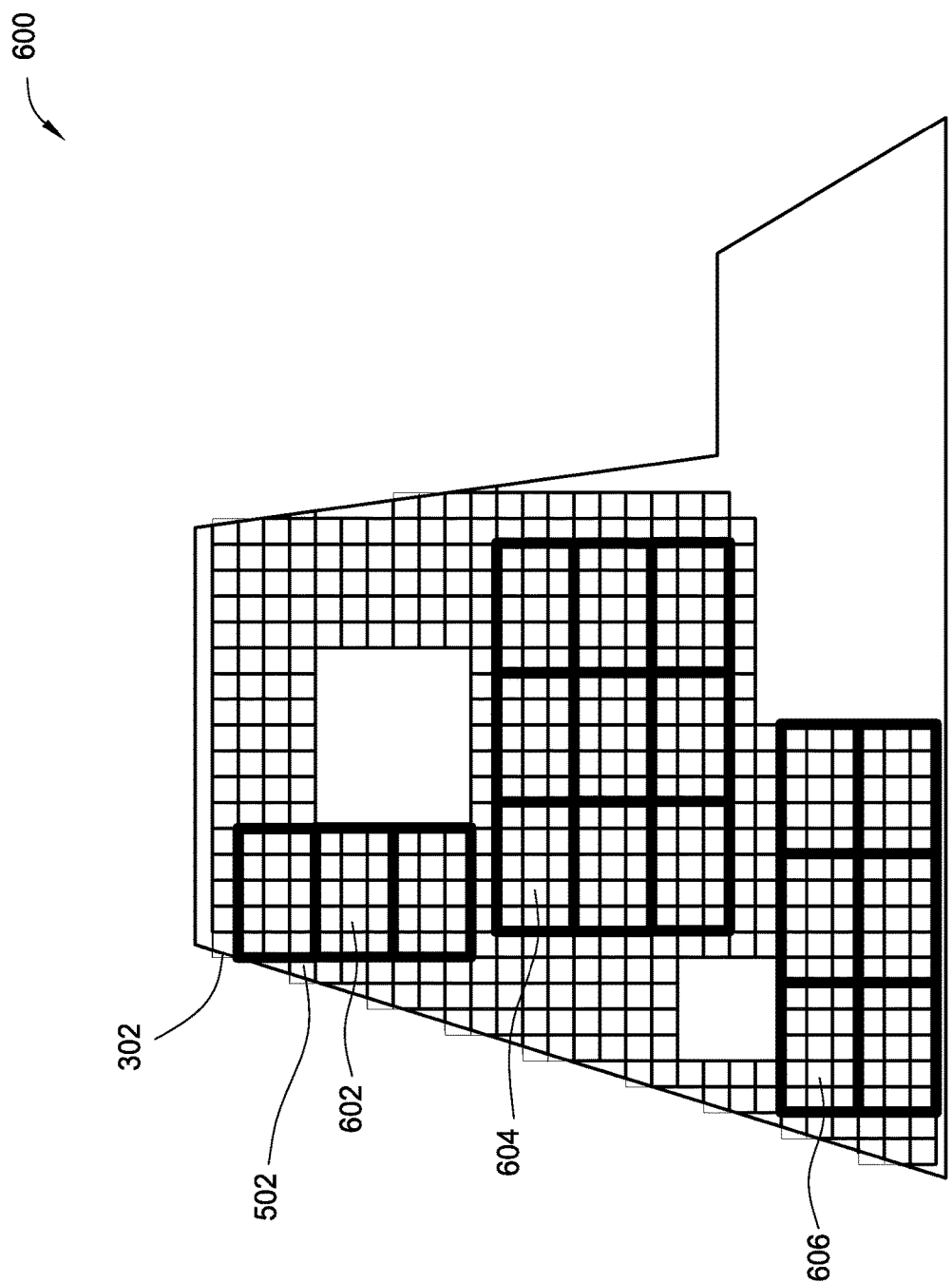

FIG. 3 relates to configuration engine 100 traversing level 212 ("site"), FIG. 4 relates to configuration engine 100 traversing levels 222 and 232 ("surfaces" and "module type," respectively), FIG. 5 relates to configuration engine 100 traversing level 242 ("sub regions"), and FIG. 6 relates to configuration engine 100 traversing levels 252 ("sub-arrays). Persons skilled in the art will understand that the conceptual diagrams described below in conjunction with FIGS. 3-6 are provided for exemplary purposes only, and should in no way limit the scope of the present invention. Additionally, those skilled in the art will recognize that any reasonable application of the techniques described conceptually below falls within the scope of the present invention.

FIG. 3 is a conceptual diagram 300 that represents a target installation location for a solar power system (i.e., a "site"). As shown, conceptual diagram 300 includes surfaces 302 and 316. Surfaces 302 and 316 may represent geospatial data describing the target installation location that is extracted from database 116 by configuration engine 100 or manually constructed through CAD interface 114. Surfaces 302 and 316 could be, e.g., the roofs of different structures, among other things.

Surface 302 includes obstructions 308, 310, 312, and 314. Obstructions 308 and 310 could be, e.g. skylights, while obstructions 312 and 314 could be, e.g. vents. An obstruction 318 partially occludes surface 316, while another obstruction 320 resides nearby to surface 316. Obstructions 318 and 320 could be, e.g., trees. In general, obstructions 308, 310, 312 and 314 and the intersection of obstruction 318 and surface 316 represent regions unsuitable for the placement of solar modules. Configuration engine 100 may identify obstructions 308, 310, 312, 314 and 318, based on the geospatial data extracted from database 116 or, alternatively, the geospatial data may include indications of various obstructions generated via CAD interface 114 in conjunction with client-side configuration engine 110.

When traversing decision tree 202 to generate candidate configurations for the solar power system, as discussed above in conjunction with FIG. 2, configuration engine 100 initially begins that traversal at level 212 of decision tree 202, which corresponds to a "site" decision associated with the solar power system configuration. Again, "site" simply refers to the target installation location. At level 212, configuration engine 100 may load data describing that location, including a physical layout of the terrain and/or structures, as shown in conceptual diagram 300. Configuration engine 100 may also load other relevant data related to the site. For example, configuration engine 100 could retrieve historical weather data, electricity rates, ecological statistics, or other relevant information. Based on that data, configuration engine 100 may compute the result of the value function discussed above in conjunction with FIG. 2 in order to generate a rough estimate of the performance of a solar power system installed at the target installation location.

Configuration engine 100 then continues to level 222 of decision tree 202, corresponding to a "surfaces" decision associated with the solar power system configuration, as discussed in greater detail below in conjunction with FIG. 4.

FIG. 4 is a conceptual diagram 400 that illustrates target surfaces 302 and 316 as well as obstructions 308, 310, 312, 314, 318, and 320. FIG. 4 also illustrates a tile grid 402 projected onto surface 302 and another tile grid 404 projected onto surface 316. Configuration engine 100 may implement tile grids 402 and 404 in order to compute value function results for candidate configurations 224 generated within level 222 of decision tree 202.

Within level 222, configuration engine 100 generates candidate configurations 224 that each includes a different selection of surfaces 302 and 316. For example, one candidate configuration could specify solar modules placed on surface 302, another candidate configuration could specify solar modules placed on surface 316, and yet another candidate configuration could specify solar modules placed on both surfaces 302 and 316. Configuration engine 100 may discard any candidate configurations that violate engineering rules for solar power systems, including, e.g., building codes, fire zones, wind zones, required inverter fill and/or voltage drop, as well as wiring rules.

When computing value function results for candidate configurations 224 using tile grids 402 and 404, configuration engine 100 may evaluate the simulated performance of each tile within a given tile grid separately and then accumulate the results of those separate evaluations. For example, configuration engine 100 could compute a value function result for a candidate configuration that includes surface 302 by evaluating the performance of each tile of tile grid 404 separately and then accumulating the results of each separate evaluation. In doing so, configuration engine 100 may evaluate the performance of a given tile based on the location, tilt, and/or orientation of the tile, a temperature estimate for the tile, a utility rate corresponding to the location of target surface 302, and an estimated amount of irradiance (net of shadows), associated with the tile. Configuration engine 100 selects the candidate configuration that optimizes the value function and which includes surface 302 (candidate configuration 226 shown in FIG. 2). Configuration engine 100 then continues to level 232 of decision tree 202, corresponding to a "module type" decision associated with the solar power system configuration.

Within level 232, configuration engine 100 generates candidate configurations 234 that each includes a different selection of solar module type, as discussed above in conjunction with FIG. 2. For example, one candidate configuration could include solar module type 410, a second candidate configuration could include solar module type 412, and a third candidate configuration could include solar module type 414.

When computing value function results for a given candidate configuration, configuration engine 100 may re-evaluate the performance of each tile associated with surface 302 based on known performance characteristics of the solar module type associated with that configuration. For example, configuration engine 100 could evaluate the performance of each tile associated with surface 302 by applying the performance characteristics of solar module type 412 to each tile within tile grid 402 and then accumulating the results of those evaluations.

Configuration engine 100 selects the candidate configuration that optimizes the value function and which includes solar module type 412 (candidate configuration 236 shown in FIG. 2). Configuration engine 100 then continues to level 242 of decision tree 202, corresponding to a "sub-regions" decision associated with the solar power system configuration, as described in greater detail below in conjunction with FIG. 5.

FIG. 5 is a conceptual diagram 500 that illustrates surface 302 along with a sub-region 502 and another sub-region 504. Sub-regions 502 and 504 represent non-contiguous portions of surface 302 onto which solar modules may be placed. Each of sub-regions 502 and 504 may be fragments of tile grid 402 shown in FIG. 4. Configuration engine 100 identifies sub-regions 502 and 504 of surface 302 when generating candidate configurations 244 within level 242 of decision tree 202.

Within level 242, configuration engine 100 generates candidate configurations 244 that each includes a different selection of sub-regions onto which solar modules may be placed. For example, configuration engine 100 could generate a candidate configuration 244 that includes sub-region 502, and another candidate configuration 244 that includes sub-region 504.

Configuration engine 100 may then compute different results of the value function for each different candidate configuration 244 and select the configuration that optimizes the value function. Configuration engine 100 may compute value function results for a given sub-region by evaluating each tile within that sub-region separately and then accumulating the separate evaluations, in like fashion as described above in conjunction with FIG. 4. In doing so, configuration engine 100 may re-evaluate the performance of each tile within the sub-region based on known performance characteristics of the solar module type associated with that configuration (previously selected within level 222 of decision tree 202).

Configuration engine 100 selects the candidate configuration that optimizes the value function and which includes sub-region 502 (candidate configuration 246 shown in FIG. 2). Configuration engine 100 then continues to level 252 of decision tree 202, corresponding to a "sub-arrays" decision associated with the solar power system configuration, as described in greater detail below in conjunction with FIG. 6.

FIG. 6 is a conceptual diagram 600 that illustrates surface 302 and sub-region 402, along with sub-arrays 602, 604, and 606. Configuration engine 100 may project sub-arrays 602, 604, and 606 onto sub-region 502 when generating candidate configurations 254 within level 252 of decision tree 202.

Within level 252, configuration engine 100 generates candidate configurations 254 that each includes a different projection of one or more sub-arrays onto surface 302.

Conceptual diagram 600 illustrates only one such projection associated with one candidate configuration, although configuration engine 100 may generate many other projections by projecting one or more sub-arrays onto surface 302 at different locations.

When computing value function results for candidate configurations 254 using different sub-arrays, configuration engine 100 may evaluate each sub-array separately and then accumulate the results of those separate evaluations. For example, configuration engine 100 could compute a value function result for a candidate configuration that includes sub-arrays 602, 604 and 606 by evaluating the simulated performance each of those sub-arrays separately and then accumulating the results of each separate evaluation. When evaluating the performance of a single sub-array, configuration engine 100 may evaluate the performance of each solar module included within that sub-array.

In one embodiment, when evaluating the performance of a single solar module, configuration engine 100 implements Sandia National Laboratories' PV Performance Model and estimates the performance of the solar module based on one or more of (i) the location and/or orientation of target surface 302, (ii) the solar module type, (iii) a utility rate corresponding to the location of target surface 302, (iv) an amount of irradiance (net of shadows) associated with the solar module, (v) long-term average or typical weather data as well as measured weather data of arbitrary duration and frequency as well as (vi) power flow simulators that account for module electrical wiring and topology. In other embodiments, National Renewable Energy Lab's PVWatts or the University of Wisconsin 5, 6, or 7 Parameter models or other performance models can be used in place of the Sandia National Laboratories' PV Performance Model.

Configuration engine 100 selects the candidate configuration that optimizes the value function and which includes sub-arrays 602, 604, and 604 (candidate configuration 256 shown in FIG. 2). Configuration engine 100 then continues to level 262 of decision tree 202, corresponding to an "arrays" decision associated with the solar power system configuration.

Within level 262, configuration engine 100 generates candidate configurations 264 that each includes a different grouping of one or more of the sub-arrays previously selected at level 252. Each such grouping is referred to herein as an "array". For example, one candidate configuration could include a first array comprised of sub-arrays 602 and 604 and a second array comprised of sub-array 606. A second candidate configuration could include a first array comprised only of sub-array 602 and a second array comprised of both sub-arrays 604 and 606.

When computing value function results for candidate configurations 264 using different possible arrays, configuration engine 100 may evaluate the performance of a given array by simulating the performance of the different strings of solar modules included within the corresponding sub-arrays being coupled together, i.e. stringing together those solar modules in series. For example, configuration engine 100 could evaluate the performance of an array that includes sub-arrays 602 and 604 by stringing together different collections solar modules ("strings") within those sub-arrays and then evaluating the performance of each string in the array. Configuration engine 100 then accumulates the evaluations across different string groups within the array in order to evaluate the performance of the array as a whole. Configuration engine 100 may repeat this process for each array associated with a given configuration and accumulate the evaluations for each array when computing the value function result for that configuration.

Configuration engine 100 selects the candidate configuration that optimizes the value function (candidate configuration 266 shown in FIG. 2). Configuration engine 100 then continues to level 272 of decision tree 202, corresponding to a "BOS" decision associated with the solar power system configuration.

Within level 272, configuration engine 100 generates candidate configurations 274 that each includes a different permutation of the remaining components required to build a solar power system, i.e. BOS. As known in the art, BOS may include a specific selection of inverter type, a particular wiring topology and gauge, one or more fuse types, and so forth. When computing value function results for candidate configurations 274, configuration engine 100 integrates all of the outcomes to design decisions made at previous levels and provides a precise evaluation of each candidate configuration 274. Configuration engine 100 may then select a candidate configuration based on the value function results, or simply generate the GUI mentioned in conjunction with FIG. 2 and receive input from the customer specifying a particular configuration.

By implementing the techniques described above in conjunction with FIGS. 3-6, configuration engine 100 may generate one or more candidate configurations for the solar power system. Again, the exemplary embodiments discussed in conjunction with FIGS. 3-6 is provided for exemplary purposes only and should not limit the scope of the invention. When traversing decision tree 202, configuration engine 100 may implement an algorithm based on the method described below in conjunction with FIG. 7.

Figure 7:
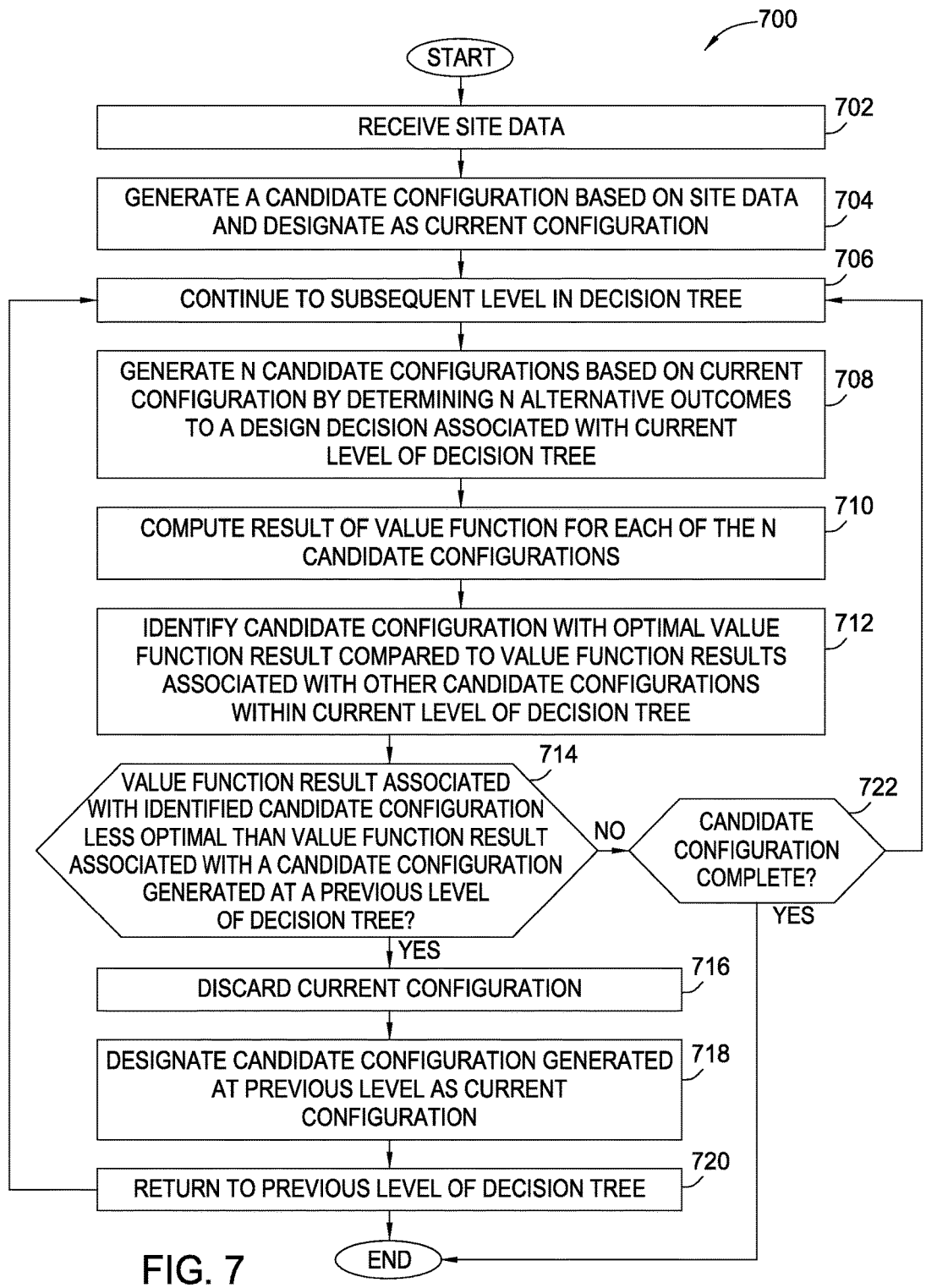
FIG. 7 is a flowchart of method steps for determining a set of solar power system configurations, according to one embodiment of the present invention.

FIG. 7 is a flowchart of method steps for determining a set of solar power system configurations, according to one embodiment of the present invention. Persons skilled in the art will understand that, although the method 700 is described in conjunction with the system of FIG. 1, any system configured to perform the method steps, in any order, is within the scope of the present invention. Configuration engine 100 may perform portions of the method 700 repeatedly when traversing decision tree 202. For example, configuration engine 100 may perform steps 706, 708, 710, 712, 714, and 722 at multiple different levels in decision tree 202. Accordingly, those steps will be described generically as being applicable to more than one level.

As shown, the method begins at step 702, where configuration engine 100 receives data describing the "site," i.e. the target installation location. The site data could include 3D geospatial data defining the terrain and/or structures located at the site, as well as other relevant data associated with the site, such as historical weather data, electricity rates, ecological statistics, and so forth.

At step 704, configuration engine 100 generates a candidate configuration based on the site data and designates that configuration as the "current configuration." Configuration engine 100 may also compute the result of the value function with the current configuration in order to generate a rough estimate of the performance of a solar power system installed at the site.

At step 706, configuration engine 100 proceeds to a subsequent level in decision tree 202. During a first pass through steps 706, 708, 710, 712, 714, and 722, configuration engine 100 proceeds to level 222 corresponding to a "surfaces" design decision associated with the solar power system configuration. During subsequent passes, configuration engine 100 may proceed to a different level of decision tree 100. Since configuration engine 100 may perform steps 706, 708, 710, 712, 714, and 722 for multiple levels of decision tree 202, as noted above, those steps will be described generically.

At step 708, configuration engine 100 generates N candidate configurations based on the current configuration by determining N alternative outcomes to a design decision associated with the current level of decision tree 202. For example, configuration engine 100 could generate N candidate configurations 224 within level 222 that each includes N alternative sets of surfaces on which solar modules may be mounted.

At step 710, configuration engine 100 computes a different result of the value function for each of the N candidate configurations generated at step 708. The inputs to the value function depend on the current level of decision tree 202, such that the inputs for a given level are based on the outcomes to the design decisions determined at previous levels of decision tree 202.

The value function itself could be derived from a wide variety of possible algorithms generally intended to estimate the value of a system, including algorithms that simply estimate the performance of candidate configurations as well as more complex algorithms that optimize the search process involved with traversing decision tree 202. In one embodiment, configuration engine 100 implements a cost function in order to estimate the cost of the various candidate configurations associated with the current level. The cost function could be, for example, a best-first search, an A star (A*) search, a distance-plus-cost function, or another heuristic-based search algorithm.

At step 712, configuration engine 100 identifies the candidate configuration with the optimal value function result compared to the value function results associated with other candidate configurations within the current level of decision tree 702. In one embodiment, configuration engine 100 identifies one or more different candidate configurations having optimal value function results compared to those associated with other candidate configurations within the current level of decision tree 702.

At step 714, configuration engine 100 determines whether the value function result associated with the candidate configuration identified at step 712 has a less optimal value function result than that associated with a candidate configuration generated at a previous level of decision tree 202. If so, then the method 700 proceeds to step 716.

At step 716, configuration engine 100 discards the current configuration, thereby "pruning" the branch of decision tree 202 associated with that configuration. At step 718, configuration engine 100 designates the candidate configuration generated at the previous level (i.e., having the more optimal value function result) as the current configuration. At step 720, configuration engine 100 returns the previous level of decision tree 202. The method then returns to step 706 proceeds as described above.

Returning to step 714, if configuration engine 100 determines that the value function result associated with the candidate configuration identified at step 712 does not have a less optimal value function result than that associated with any candidate configurations generated at previous levels of decision tree 202, the method proceeds to step 722.

At step 722, configuration engine 100 determines whether the current configuration is complete, i.e. configuration engine 100 has generated a candidate configuration residing within level 272 of decision tree 202. If configuration engine 100 determines that the current configuration is not complete, then the method 700 returns to step 706 and proceeds as described above. Otherwise, the method 700 ends.

By implementing the method 700, including performing steps 706, 708, 710, 712, 714, and 722 one or more times, configuration engine 100 traverses decision tree 202, thereby generating one or more complete configurations for the solar power system.

Pricing Solar Power Configurations

Figure 8:
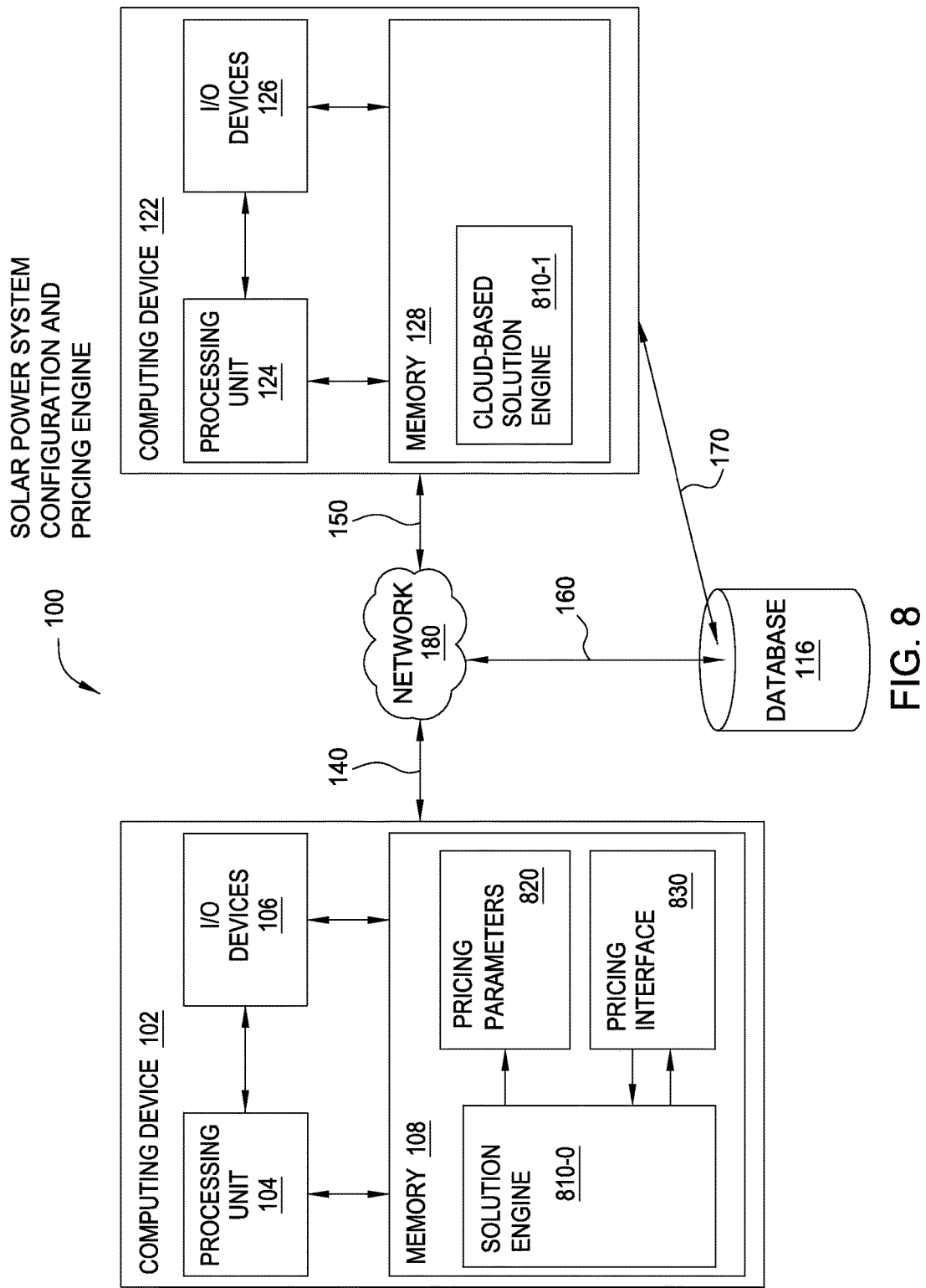
FIG. 8 illustrates various engines within the computer system of FIG. 1 configured to generate and display pricing solutions for solar power systems, according to one embodiment of the present invention.

FIG. 8 illustrates various engines within the computer system of FIG. 1 configured to generate and display pricing solutions for solar power systems, according to one embodiment of the present invention. As shown, solar power system configuration and pricing engine 100, referred to hereinafter simply as "pricing engine 100", includes some of the same elements as shown in FIG. 1, including computing devices 102 and 122, database 116, and network 180. In addition, pricing engine 100 now includes client-side solution engine 810-0, pricing parameters 820, and pricing interface 830 within memory 108 of computing device 102. Pricing engine 100 also now includes cloud-based solution engine 810-1 within memory 128 of computing device 122.

Client-side solution engine 810-0 is a software program that includes a set of program instructions capable of being executed by processing unit 104. When executed by processing unit 104, client-side solution engine 810-0 configures processing unit 104 to participate in generating multiple pricing solutions for a solar power system to be installed on the target surface. The solar power system could be configured using the techniques described above in conjunction with FIG. 1-7, or configured using alternate techniques.

In the context of this disclosure, the term "pricing solution" refers to the cost or rate of return, over any time period, of a solar installation. Additionally, the term "pricing parameter" refers to any quantity or collection of quantities, including the financial model, used to generate the pricing solution for a solar installation.

Pricing parameters 820 could include, for example, such solar system configuration parameters as the solar power system size in peak kilowatts (kWp) or the solar power system production in kilowatt-hours (kWh). Pricing parameters 820 could also include such financial parameters as the purchase rebate, the lease term, the down payment, the initial electricity rate, the customer's credit rating, and so forth. Further, pricing parameters 820 could include such financial models such as net present value or internal rate of return. Those skilled in the art will understand that the aforementioned parameters are illustrative only and that any quantifiable factor associated with a solar power system installation could be used as a pricing parameter.

When generating a pricing solution, client-side solution engine 810-0 may cooperate with a corresponding software program within computing device 122, cloud-based solution engine 810-0, in order to determine the various pricing solutions for one or more solar power system configurations. Cloud-based solution engine 810-1 is a software program that includes a set of program instructions capable of being executed by processing unit 124. When executed by processing unit 124, cloud-based solution engine 810-1 configures processing unit 124 to cooperate with client-side solution engine 810-0 in generating solar power system pricing solutions.

Persons skilled in the art will understand that client-side solution engine 810-0 and cloud-based solution engine 810-1 may interact with one another in any technically feasible fashion to generate pricing solutions for one or more solar power system configurations. As such, for the sake of simplicity, client-side solution engine 810-0 and cloud-based solution engine 810-1 will be referred to hereinafter collectively as "solution engine 810."

Pricing interface 830 is a software program that includes a set of program instructions capable of being executed by processing unit 104. When executed by processing unit 104, pricing interface 830 generates a GUI (shown in FIGS. 9A-9B) that presents pricing parameters 820 to a user in graphical form. The user may manipulate GUI elements of that user interface to determine values for pricing parameters 820. Solution engine 810 applies pricing parameters 820 to the target installation to generate pricing solutions, which are then returned to pricing interface 830 and presented to the user, as described in greater detail below.

Figure 9A:
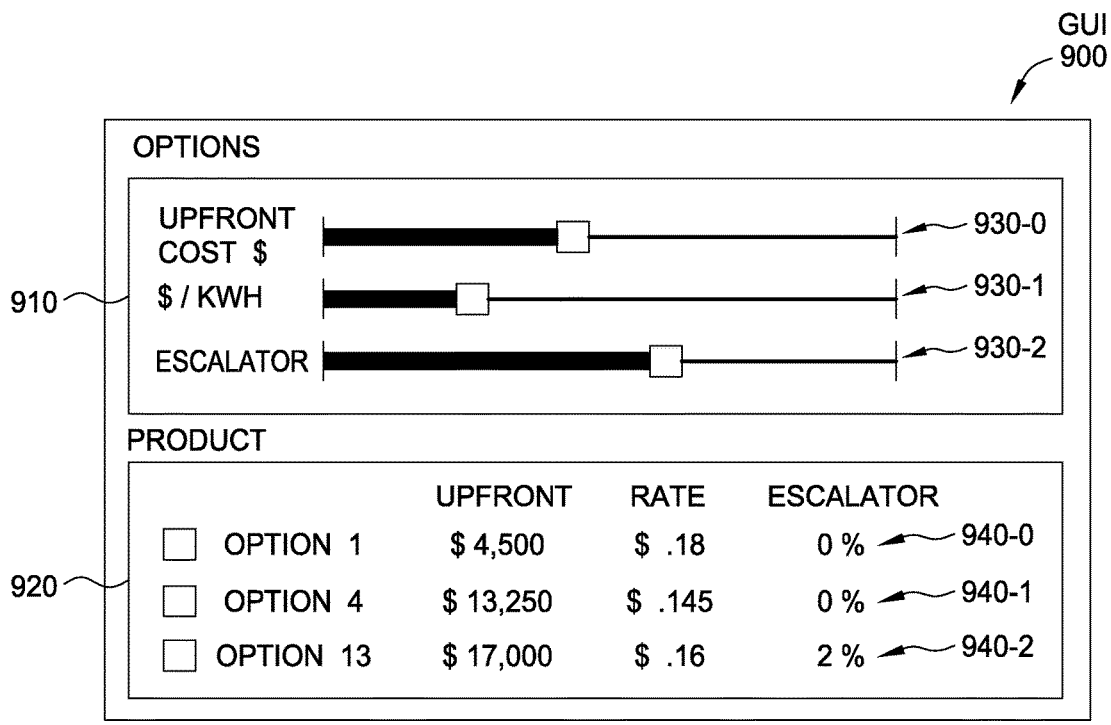
FIGS. 9A-9B are conceptual diagrams illustrating a graphical user interface for filtering pricing solutions based on user input, according to one embodiment of the present invention.
Figure 9B:
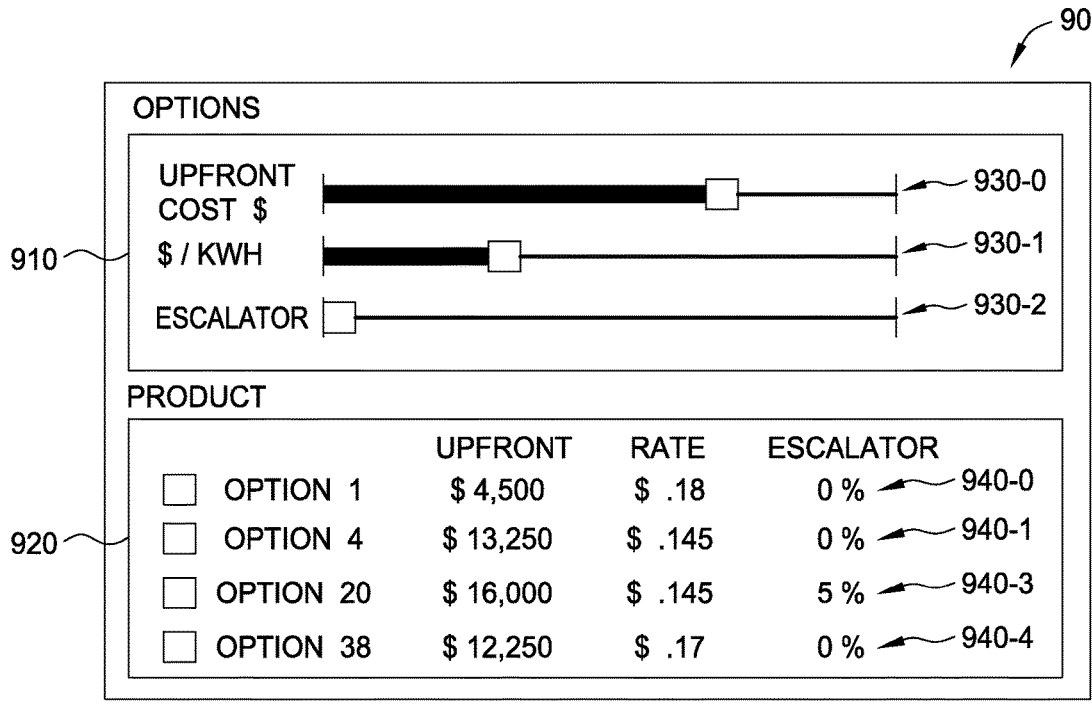

FIGS. 9A-9B are conceptual diagrams illustrating a GUI 900 for filtering pricing solutions based on user input, according to one embodiment of the present invention. Pricing interface 830 is configured to generate GUI 900 in order to interact with the user of pricing engine 100, including receiving user input and providing output to the user. As shown, GUI 900 includes a filter interface 910 and a solution interface 920. Filter interface 910 includes GUI filters 930-0 through 930-2, and solution interface 920 includes pricing options 940-0 through 940-2. Those skilled in the art will understand that the use of sliders and checkboxes in FIGS. 9A-9B is provided for illustrative purposes only and that any suitable user interface widgets to sort, filter or otherwise interact with the pricing solutions may be used.

In FIG. 9A, GUI filters 930 are positioned to represent a specific set of selected values for pricing parameters 820. Those values correspond to an upfront dollar cost, a dollars per kilowatt-hour, and an escalator for a given solar power system configuration. Pricing interface 930 shows the computed pricing options 940 which correspond to the values selected by GUI filters 930. The user of GUI 900 within pricing engine 100 may manipulate GUI filters 930 in order to select a different set of pricing parameters 820, and pricing interface 930 may then compute a different set of pricing options 940, as shown in FIG. 9B.

In FIG. 9B, GUI filters 930 have a different position (e.g., reflecting newly-received user input), resulting in changes to pricing options 940. In particular, pricing options 940-2 is no longer available and pricing options 940-3 and 940-4 are now available. Pricing interface 830 is configured to receive the updated values of GUI filters 930 and to then recompute pricing options 940. In one embodiment, the minimum and maximum values of GUI filters 930 reflect acceptable ranges for those parameters as indicated by a lending institution potentially offering financing for the solar power system. Persons skilled in the art will recognize that pricing interface 830 may perform the process of receiving user input and computing updated pricing options 940 repeatedly.

Referring generally to FIGS. 9A-9B, once pricing options 940 have been generated, the user may select one or more pricing options 940 by clicking on the corresponding check box. Persons skilled in the art will recognize that other interface elements configured to receive a selection of a pricing option 940 also fall within the scope of the present invention. In this fashion, pricing interface 830 may provide a simple and convenient interface whereby a user, such as a potential customer, an installation technician, or a salesperson, may quickly navigate the spectrum of possible pricing solutions for a given solar power system installation. With the techniques described herein, the process of identifying and selecting financing for a solar power system may be streamlined compared to prior art techniques.

Figure 10:
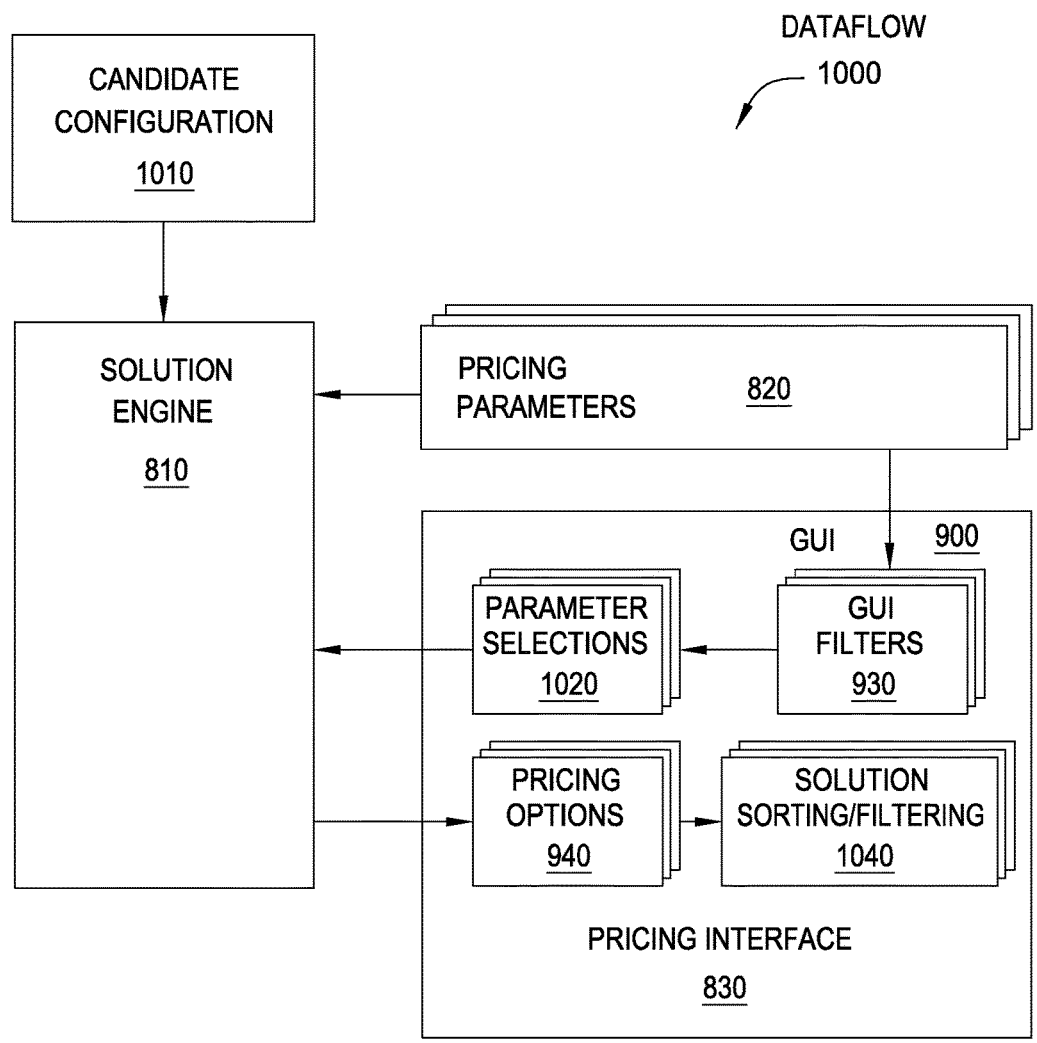
FIG. 10 is a data flow diagram illustrating data that the various engines of FIG. 8 process to generate and display pricing solutions for solar power systems, according to one embodiment of the present invention.

FIG. 10 is a data flow diagram illustrating data that is processed to generate and display pricing solutions for solar power systems, according to one embodiment of the present invention. As shown, solution engine 810 receives a candidate configuration 1010, pricing parameters 820, and parameter selections 1020, and then generates pricing options 940. Candidate configuration 1010 may be a solar configuration output by method 700 or any other solar configuration sent to solution engine 810.

Parameter selections 1020 are generated by pricing interface 830 from pricing parameters 820 and GUI filters 930. As describe above in conjunction with FIGS. 9A-9B, GUI 900 presents pricing parameters 820 to a user via GUI filters 930. The user may manipulate GUI filters 930 to select values for some or all of pricing parameters 820. The resulting values are used to generate parameter selections 1020. Interface engine 830 sends parameter selections 1020 to solution engine 810.

Solution engine 810 uses pricing parameters 820, parameter selections 1020 and candidate configuration 1010 to generate pricing options 940. Pricing solutions are sent through pricing interface 830 to GUI 900 where they are presented to the user via solution sorting/filtering 1040. The user may select from the presented pricing options 940 or adjust GUI filters 930 to generate alternate pricing options 940.

Figure 11:
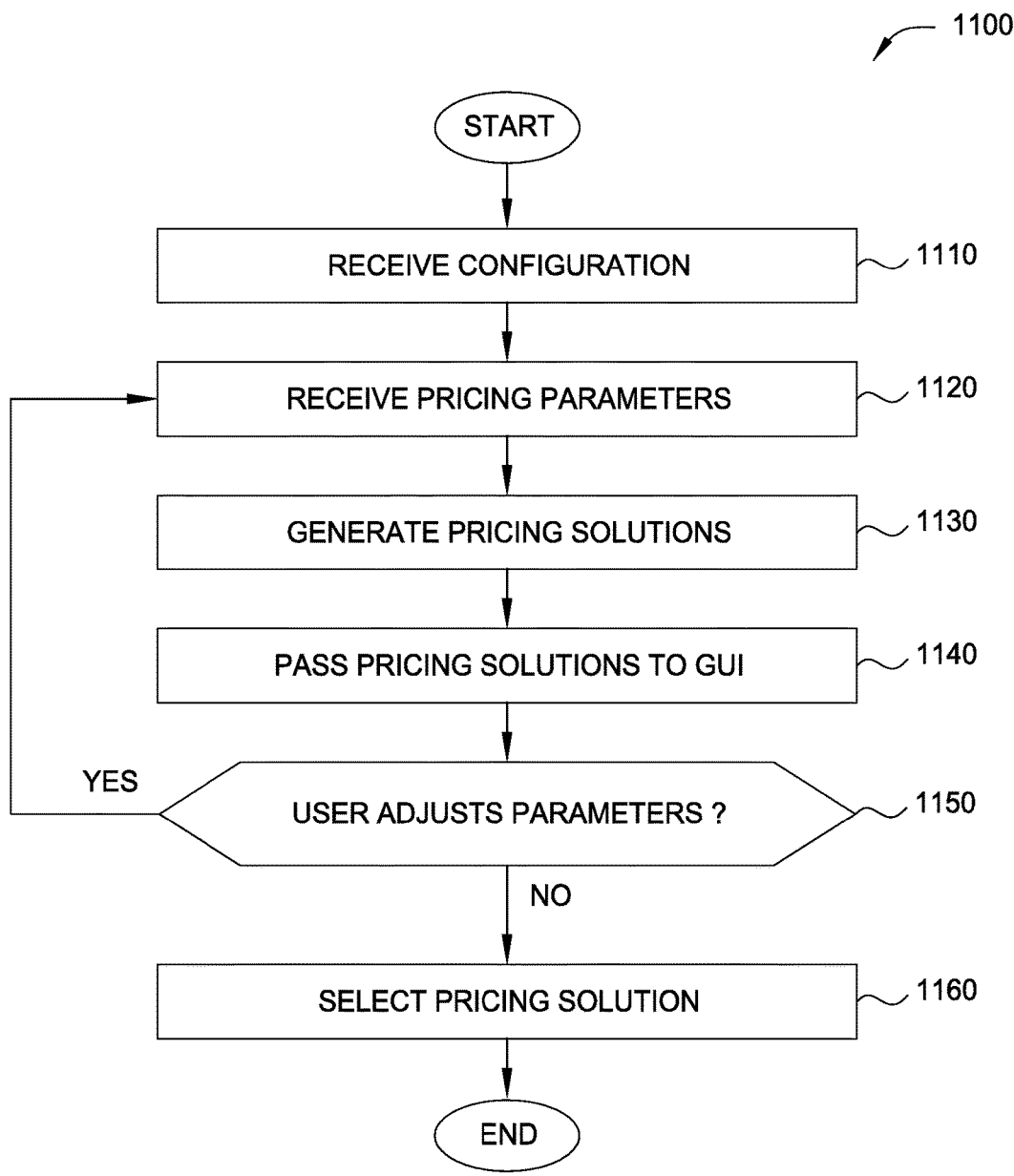
FIG. 11 is a flowchart of method steps for generating and displaying pricing solutions for a solar power system, according to one embodiment of the present invention.

In one embodiment of the current invention, pricing parameters 820 and parameter selections 1020 are applied to one candidate configuration 1010 to generate pricing options 940. In another embodiment of the current invention, pricing parameters 820 and parameter selections 1020 are applied to multiple candidate configurations 1010 to generate pricing options 940. In yet another embodiment, pricing parameters 820 and parameter selections 1020 may be used at step 704 of the method 700 shown in FIG. 7 to generate candidate configurations, and pricing solutions 1030 may be used within the method 700 as a value function at step 710. FIG. 11, described in greater detail below illustrates the generic functionality of solution engine 810 in a stepwise fashion.

FIG. 11 is a flowchart of method steps for pricing a candidate configuration 1010, according to one embodiment of the present invention. Persons skilled in the art will understand that, although the method 1100 is described in conjunction with the system of FIGS. 1-10, any system configured to perform the method steps, in any order, is within the scope of the present invention.

As shown, a method 1100 begins at step 1110, where solution engine 810 receives candidate configuration 1010. Candidate configuration 1010 may be a configuration generated via the method 700 or may be any other solar power configuration.

At step 1120, solution engine 810 receives pricing parameters 820 and parameter selections 1020. Pricing parameters 820 may reflect a standard set of parameters used to compute pricing solutions for solar power system configurations, while parameter selections reflect user-selected values of pricing parameters 820. At step 1130, solution engine 810 generates pricing options 940 based on the specific set of pricing parameters selected at step 1120. At step 1140, solution engine 810 sends pricing options 940 to pricing interface 830, which, in turn, populates solution interface 920 with a set of pricing solutions.

At step 1150, the user may adjust the GUI filters 930 with GUI 900. If the user changes the GUI filters 930, then pricing interface 830 generates a new set of parameter selections 1020 and the method 1100 returns to step 1120 and proceeds as described above. If the user does not adjust GUI filters 820, then the method 700 continues to step 1160.

At step 1160, the user selects one or more solution checkboxes via solution sorting/filtering 1040. Solution sorting/filtering 1040 may include checkboxes or other elements for receiving a selection of a pricing option 940. In this fashion, the user may identify one or more available pricing options 940, thereby indicating a preference to those pricing options 940. The method 1100 then ends.

In sum, a solar power system configuration and pricing engine is configured to generate solar power configurations and corresponding pricing solutions with minimal involvement from a user. Solar power configurations are generated by automatically exploring a decision tree of design options. The resulting configurations are combined with pricing parameters associated with a financial model to produce pricing solutions. The user can modify either the pricing parameters or the configuration to generate alternate sets of pricing solutions. The resulting pricing solutions can then be selected and presented to the customer.

Advantageously, the number of solar power configurations and pricing solutions that can be explored is greatly expanded resulting in more available options and lower cost for the buyer. Furthermore, the user exploring the available pricing solutions requires minimal training in the financial models used to price solar power installations, thereby streamlining the process of identifying and selecting pricing solutions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for generating pricing solutions for a solar power system configuration, each pricing solution reflecting one or more pricing parameters, the method comprising:
   receiving a solar power system configuration generated by, beginning with an initial solar power system configuration at a first level of a decision tree comprised of a plurality of sequential levels and traversing the decision tree in one direction until a final level is reached, selecting one solar power system configuration of a plurality of solar power system configurations at each level of the decision tree beginning with the first level and ending with a selection of an optimized solar power configuration at the final level, wherein the selection at each level includes determining an outcome to one design decision associated with the given level by computing results from one value function applied to the plurality of solar power system configurations;
   receiving, via a graphical user interface (GUI displayed by a display device, a set of pricing parameters, wherein a first pricing parameter in the set of pricing parameters reflects a first attribute of the solar power system configuration and a corresponding first range of possible values for the first attribute;
   receiving, via the GUI, a selection of a subset of the first range of possible values associated with the first pricing parameter;
   generating, by a processing unit coupled to the display device, at least one pricing solution based on the selection of the subset of the first range of possible values, wherein the at least one pricing solution comprises a price for the solar power system configuration that is constrained by the subset of the first range of possible values; and
   displaying, on the display device, the at least one pricing solution.

2. The computer-implemented method of claim 1, wherein the set of pricing parameters includes at least one of a purchase rebate, a lease term, a down payment, an initial electricity rate, an escalator value, an upfront cost, a net present value, and a rate of return associated with the solar power system configuration.

3. The computer-implemented method of claim 1, wherein the first range of possible values reflects at least one of a minimum value for the first attribute and a maximum value for the first attribute, and wherein the first range of possible values is specified by a lender capable of financing construction of the solar power system configuration.

4. The computer-implemented method of claim 1, wherein receiving the selection of the subset of the first range of possible values comprises:
   generating a graphical user interface (GUI) including a GUI element that reflects the first range of possible values associated with the first pricing parameter; and
   receiving input from an end-user that indicates at least one of a selected maximum value for the first range of possible values and a selected minimum value of for the first range of possible values.

5. The computer-implemented method of claim 1, wherein generating the at least one pricing solution comprises executing a financial model based on a value in the subset of the first range of possible values.

6. The computer-implemented method of claim 1, wherein the financial model comprises a net present value (NPV) financial model of the solar power system configuration.

7. The computer-implemented method of claim 1, further comprising:
   receiving site data that describes constraints associated with a target installation location for a solar power system;
   generating the initial solar power system configuration based on the site data; and
   generating the solar power system.

8. The computer-implemented method of claim 1, wherein the value function comprises levelized cost of electricity (LCOE), net present value (NPV), an A star (A*) function, or a best-first function.

9. The computer-implemented method of claim 1, wherein the design decision associated with the given level comprises (i) a selection of target surfaces suitable for the placement of solar modules, (ii) a selection of a type of solar module, (iii) a selection of one or more non-contiguous sub-regions of a target surface, (iv) a placement of solar modules on the target surface, (v) a grouping of solar modules, or (vi) a selection of balance of system (BOS) components.

10. A non-transitory computer-readable medium storing program instructions that, when executed by a processing unit, cause the processing unit to generate pricing solutions for a solar power system configuration, each pricing solution reflecting one or more pricing parameters, by performing the steps of:
  receiving a solar power system configuration generated by, beginning with an initial solar power system configuration at a first level of a decision tree comprised of a plurality of sequential levels and traversing the decision tree in one direction until a final level is reached, selecting one solar power system configuration of a plurality of solar power system configurations at each level of the decision tree beginning with the first level and ending with a selection of an optimized solar power configuration at the final level, wherein the selection at each level includes determining an outcome to one design decision associated with the given level by computing results from one value function applied to the plurality of solar power system configurations;
  receiving, via a graphical user interface (GUI) displayed by a display device, a set of pricing parameters, wherein a first pricing parameter in the set of pricing parameters reflects a first attribute of the solar power system configuration and a corresponding first range of possible values for the first attribute;
  receiving, via the GUI, a selection of a subset of the first range of possible values associated with the first pricing parameter;
  generating, by a processing unit coupled to the display device, at least one pricing solution based on the selection of the subset of the first range of possible values, wherein the at least one pricing solution comprises a price for the solar power system configuration that is constrained by the subset of the first range of possible values; and
  displaying, on the display device, the at least one pricing solution.

11. The non-transitory computer-readable medium of claim 10, wherein the set of pricing parameters includes at least one of a purchase rebate, a lease term, a down payment, an initial electricity rate, an escalator value, an upfront cost, a net present value, and a rate of return associated with the solar power system configuration.

12. The non-transitory computer-readable medium of claim 10, wherein the first range of possible values reflects at least one of a minimum value for the first attribute and a maximum value for the first attribute, and wherein the first range of possible values is specified by a lender capable of financing construction of the solar power system configuration.

13. The non-transitory computer-readable medium of claim 10, wherein the step of receiving the selection of the subset of the first range of possible values comprises:
  generating a graphical user interface (GUI) including a GUI element that reflects the first range of possible values associated with the first pricing parameter; and
  receiving input from an end-user that indicates at least one of a selected maximum value for the first range of possible values and a selected minimum value of for the first range of possible values.

14. The non-transitory computer-readable medium of claim 10, wherein the step of generating the at least one pricing solution comprises executing a financial model based on a value in the subset of the first range of possible values.

15. The non-transitory computer-readable medium of claim 10, wherein the financial model comprises a net present value (NPV) financial model of the solar power system configuration.

16. The non-transitory computer-readable medium of claim 10, further comprising the step of generating the solar power system configuration by:
  receiving site data that describes constraints associated with a target installation location for a solar power system;
  generating the initial solar power system configuration based on the site data; and
  generating the solar power system.

17. The non-transitory computer-readable medium of claim 10, wherein the value function comprises levelized cost of electricity (LCOE), net present value (NPV), an A star (A*) function, or a best-first function.

18. The non-transitory computer-readable medium of claim 10, wherein the design decision associated with the given level comprises (i) a selection of target surfaces suitable for the placement of solar modules, (ii) a selection of a type of solar module, (iii) a selection of one or more non-contiguous sub-regions of a target surface, (iv) a placement of solar modules on the target surface, (v) a grouping of solar modules, or (vi) a selection of balance of system (BOS) components.

19. A system configured to generate pricing solutions for a solar power system configuration, each pricing solution reflecting one or more pricing parameters, comprising:
  a memory unit;
  a processing unit coupled to the memory unit and configured to:
    receive a solar power system configuration generated by, beginning with an initial solar power system configuration at a first level of a decision tree comprised of a plurality of sequential levels and traversing the decision tree in one direction until a final level is reached, selecting one solar power system configuration of a plurality of solar power system configurations at each level of the decision tree beginning with the first level and ending with a selection of an optimized solar power configuration at the final level, wherein the selection at each level includes determining an outcome to one design decision associated with the given level by computing results from one value function applied to the plurality of solar power system configurations;
    receive, via a graphical user interface (GUI) rendered by the processing unit, a set of pricing parameters, wherein a first pricing parameter in the set of pricing parameters reflects a first attribute of the solar power system configuration and a corresponding first range of possible values for the first attribute;
    receive, via the GUI, a selection of a subset of the first range of possible values associated with the first pricing parameter; and
    generate at least one pricing solution based on the selection of the subset of the first range of possible values, wherein the at least one pricing solution comprises a price for the solar power system configuration that is constrained by the subset of the first range of possible values; and
  a display device coupled to the processing unit and configured to:

display the GUI, and display the at least one pricing solution within the GUI.

20. The system of claim 19, wherein the processing unit resides within a server machine, the display device resides within a client machine coupled to the server machine, and the processing unit is configured to transmit the GUI to the client machine, for display by the display device, upon generating the GUI.

21. The system of claim 19, wherein the processing unit and the display device reside within a client machine, and the processing unit is configured to cause the display device to display the GUI rendering the GUI.

* * * * *